US010612388B2

(12) United States Patent
Propheter-Hinckley et al.

(10) Patent No.: US 10,612,388 B2
(45) Date of Patent: Apr. 7, 2020

(54) GAS TURBINE ENGINE AIRFOIL COOLING CIRCUIT

(71) Applicant: UNITED TECHNOLOGIES CORPORATION, Hartford, CT (US)

(72) Inventors: Tracy A. Propheter-Hinckley, Manchester, CT (US); Rafael A. Perez, Arecibo, PR (US); Edward F. Pietraszkiewicz, Southington, CT (US)

(73) Assignee: United Technologies Corporation, Farmington, CT (US)

( * ) Notice: Subject to any disclaimer, the term of this patent is extended or adjusted under 35 U.S.C. 154(b) by 388 days.

(21) Appl. No.: 14/837,014

(22) Filed: Aug. 27, 2015

(65) Prior Publication Data

US 2016/0017717 A1 Jan. 21, 2016

Related U.S. Application Data

(63) Continuation of application No. 13/326,720, filed on Dec. 15, 2011, now Pat. No. 9,145,780.

(51) Int. Cl.
*F01D 5/18* (2006.01)
*F01D 9/04* (2006.01)

(52) U.S. Cl.
CPC .............. *F01D 5/186* (2013.01); *F01D 5/187* (2013.01); *F01D 9/041* (2013.01); *F05D 2240/12* (2013.01); *F05D 2250/185* (2013.01); *F05D 2260/202* (2013.01); *Y02T 50/673* (2013.01); *Y02T 50/676* (2013.01)

(58) Field of Classification Search
CPC . F01D 5/186; F01D 5/08; F01D 5/081; F01D 5/082; F01D 5/084; F01D 5/18; F01D 5/187; F01D 5/188; F01D 5/189; F05D 2250/185; F05D 2260/202; F05D 2260/20; F05D 2260/201; F05D 2260/221; F05D 2260/222; F05D 2260/224
See application file for complete search history.

(56) References Cited

U.S. PATENT DOCUMENTS 3,807,892 A 4/1974 Frei et al.
4,278,400 A 7/1981 Yamarik et al.
(Continued)

FOREIGN PATENT DOCUMENTS

WO 9412766 A1 6/1994

OTHER PUBLICATIONS

Extended European Search Report for European Application No. EP 12 19 7302 dated Oct. 14, 2013.

*Primary Examiner* — Moshe Wilensky
*Assistant Examiner* — Jesse M Prager
(74) *Attorney, Agent, or Firm* — Carlson, Gaskey & Olds, P.C.

(57) ABSTRACT

An airfoil for a gas turbine engine according to an exemplary aspect of the present disclosure includes, among other things, an airfoil body and a cooling circuit disposed inside the airfoil body and including a leading edge cavity with a first portion extending from a radially inner wall to a radially outer wall of the airfoil body and a second portion that extends from a leading edge inner wall to a trailing edge inner wall of the airfoil body. The cooling circuit is configured to communicate cooling airflow through the first portion and the second portion prior to exiting the leading edge cavity into a second cavity of the cooling circuit.

15 Claims, 4 Drawing Sheets

(56) References Cited

U.S. PATENT DOCUMENTS

| | | | |
|---|---|---|---|
| 4,767,268 | A | 8/1988 | Auxier et al. |
| 5,462,405 | A | 10/1995 | Hoff et al. |
| 5,601,399 | A | 2/1997 | Okpara et al. |
| 5,772,397 | A | 6/1998 | Morris et al. |
| 5,941,687 | A | 8/1999 | Tubbs |
| 5,967,752 | A | 10/1999 | Lee et al. |
| 6,132,169 | A | 10/2000 | Manning et al. |
| 6,435,813 | B1 | 8/2002 | Rieck, Jr. et al. |
| 6,609,884 | B2 | 8/2003 | Harvey |
| 6,874,987 | B2 | 4/2005 | Slinger et al. |
| 6,874,988 | B2 | 4/2005 | Tiemann |
| 6,874,992 | B2 | 4/2005 | Dailey |
| 6,939,102 | B2 * | 9/2005 | Liang ................ F01D 5/188 415/115 |
| 6,969,230 | B2 | 11/2005 | Shi et al. |
| 7,198,468 | B2 | 4/2007 | Papple |
| 7,435,053 | B2 * | 10/2008 | Liang ................ F01D 5/187 416/97 R |
| 7,458,778 | B1 | 12/2008 | Liang |
| 7,547,191 | B2 | 6/2009 | Liang |
| 7,690,894 | B1 * | 4/2010 | Liang ................ F01D 5/186 415/115 |
| 7,955,053 | B1 | 6/2011 | Liang |
| 7,967,563 | B1 | 6/2011 | Liang |
| 7,988,419 | B1 | 8/2011 | Liang |
| 8,142,153 | B1 | 3/2012 | Liang |
| 8,186,953 | B1 | 5/2012 | Kimmel |
| 8,297,927 | B1 | 10/2012 | Liang |
| 8,317,472 | B1 | 11/2012 | Liang |
| 8,491,264 | B1 | 7/2013 | Liang |
| 8,556,583 | B2 | 10/2013 | Fujimura et al. |
| 8,596,966 | B1 | 12/2013 | Liang |
| 2003/0147750 | A1 | 8/2003 | Slinger et al. |
| 2006/0153678 | A1 | 7/2006 | Liang |
| 2009/0232661 | A1 | 9/2009 | Ryznic |
| 2010/0047078 | A1 | 2/2010 | Townes et al. |
| 2011/0243717 | A1 | 10/2011 | Gleiner et al. |

\* cited by examiner

GAS TURBINE ENGINE AIRFOIL COOLING CIRCUIT

CROSS-REFERENCE TO RELATED APPLICATION

This application is a continuation of U.S. patent application Ser. No. 13/326,720, filed Dec. 15, 2011.

BACKGROUND

This disclosure relates to a gas turbine engine, and more particularly to an airfoil cooling circuit for cooling an airfoil of a gas turbine engine.

Gas turbine engines typically include a compressor section, a combustor section and a turbine section. In general, during operation, air is pressurized in the compressor section and mixed with fuel and burned in the combustor section to generate hot combustion gases. The hot combustion gases flow through the turbine section which extracts energy from the hot combustion gases to power the compressor section and other gas turbine engine loads.

The compressor and turbine sections of the gas turbine engine typically include alternating rows of rotating blades and stationary vanes. The rotating blades extract the energy from the hot combustion gases that are communicated through the gas turbine engine, and the vanes convert the velocity of the airflow into pressure and prepare the airflow for the next set of blades. The hot combustion gases are communicated over airfoil bodies of the blades and vanes. The airfoil bodies can include cooling circuits that receive cooling airflow for cooling the airfoils during engine operation.

SUMMARY

An airfoil for a gas turbine engine according to an exemplary aspect of the present disclosure includes, among other things, an airfoil body and a cooling circuit disposed inside the airfoil body and including a leading edge cavity with a first portion extending from a radially inner wall to a radially outer wall of the airfoil body and a second portion that extends from a leading edge inner wall to a trailing edge inner wall of the airfoil body. The cooling circuit is configured to communicate cooling airflow through the first portion and the second portion prior to exiting the leading edge cavity into a second cavity of the cooling circuit.

In a further non-limiting embodiment of the foregoing airfoil, the second portion includes an oxbow shaped portion that transitions the leading edge cavity into the second cavity.

In a further non-limiting embodiment of either of the foregoing airfoils, the airfoil is a vane.

In a further non-limiting embodiment of any of the foregoing airfoils, a rib extends between the leading edge cavity and the second cavity.

In a further non-limiting embodiment of any of the foregoing airfoils, the rib includes a plurality of openings that extend through the rib between the leading edge cavity and the second cavity.

In a further non-limiting embodiment of any of the foregoing airfoils, the plurality of openings include increasing sizes in a direction extending from the radially inner wall toward the radially outer wall.

In a further non-limiting embodiment of any of the foregoing airfoils, the rib is L-shaped.

In a further non-limiting embodiment of any of the foregoing airfoils, a third cavity is in fluid communication with the second cavity. The third cavity includes a close-ended portion.

In a further non-limiting embodiment of any of the foregoing airfoils, the third cavity extends across a length that is smaller than a length of a trailing edge of the airfoil body.

In a further non-limiting embodiment of any of the foregoing airfoils, the closed-ended portion is disposed adjacent to an L-shaped portion of a rib.

An airfoil for a gas turbine engine according to another exemplary aspect of the present disclosure includes, among other things, an airfoil body having a trailing edge that establishes a first length and a serpentine cooling circuit within the airfoil body and having a trailing edge cavity adjacent to the trailing edge that is in fluid communication with at least one other cavity of the serpentine cooling circuit. The trailing edge cavity extends across a second length of the airfoil body that is less than the first length and includes a close-ended portion.

In a further non-limiting embodiment of the foregoing airfoil, the closed-ended portion is disposed adjacent to an L-shaped portion of a rib.

In a further non-limiting embodiment of either of the foregoing airfoils, the rib separates the trailing edge cavity from the at least one other cavity.

In a further non-limiting embodiment of any of the foregoing airfoils, the rib includes a plurality of openings that extend through the rib between trailing edge cavity and the at least one other cavity.

In a further non-limiting embodiment of any of the foregoing airfoils, the serpentine cooling circuit includes a leading edge cavity with a first portion extending from a radially inner wall to a radially outer wall of the airfoil body and a second portion that extends from a leading edge inner wall to a trailing edge inner wall of the airfoil body.

In a further non-limiting embodiment of any of the foregoing airfoils, the second portion includes an oxbow shaped portion that transitions the leading edge cavity into another cavity.

In a further non-limiting embodiment of any of the foregoing airfoils, the serpentine cooling circuit is configured to communicate cooling airflow through the first portion and the second portion prior to exiting the leading edge cavity into a second cavity.

The various features and advantages of this disclosure will become apparent to those skilled in the art from the following detailed description. The drawings that accompany the detailed description can be briefly described as follows.

DETAILED DESCRIPTION

Figure 1:
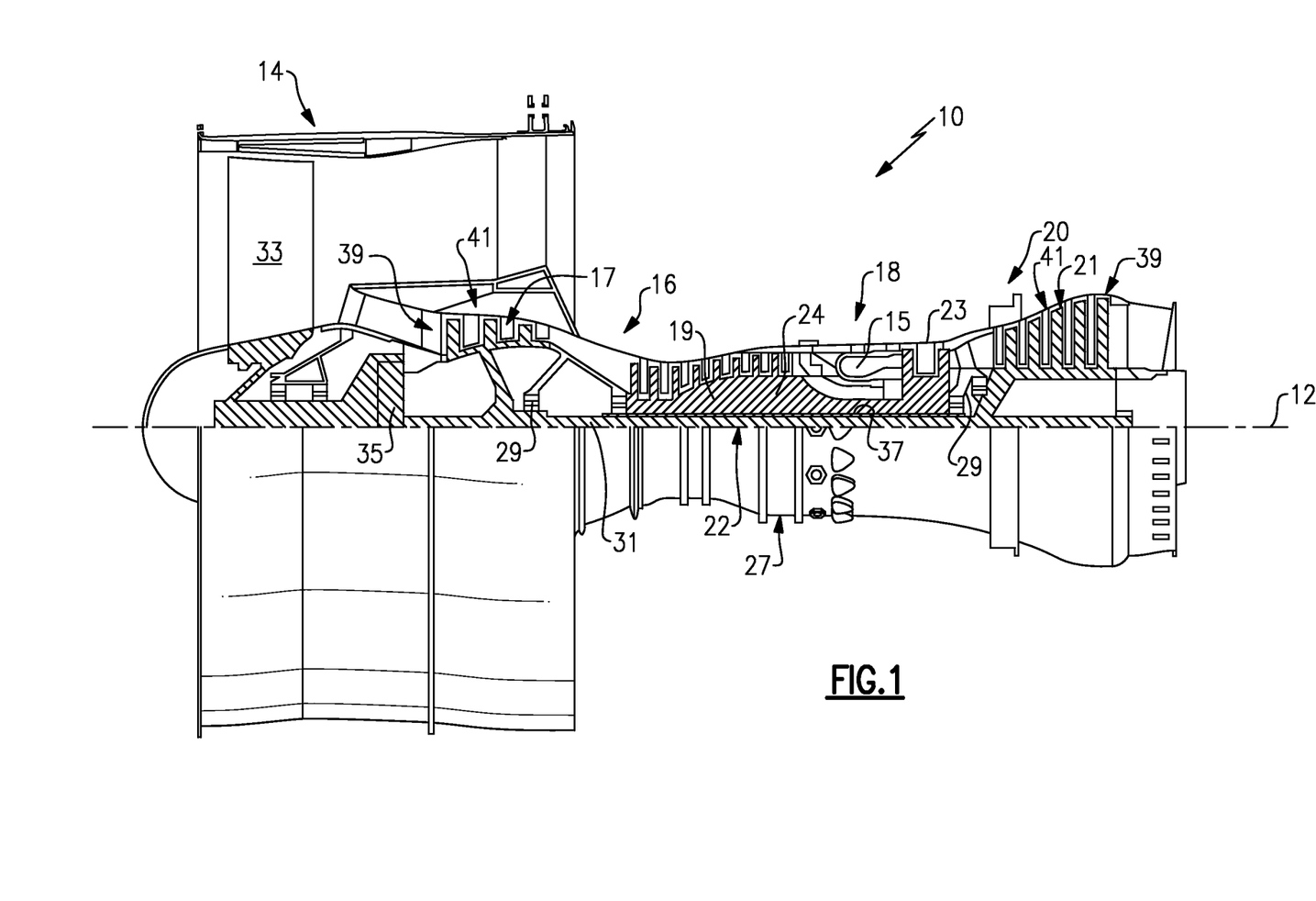
FIG. 1 schematically illustrates a gas turbine engine.

FIG. 1 schematically illustrates a gas turbine engine 10. The example gas turbine engine 10 is a two spool turbofan engine that generally incorporates a fan section 14, a compressor section 16, a combustor section 18 and a turbine section 20. Alternative engines might include fewer or additional sections such as an augmenter section (not shown), among other systems or features. Generally, the fan section 14 drives air along a bypass flow path, while the compressor section 16 drives air along a core flow path for compression and communication into the combustor section 18. The hot combustion gases generated in the combustor section 18 are expanded through the turbine section 20.

This view is highly schematic and is included to provide a basic understanding of the gas turbine engine 10 and not to limit the disclosure. This disclosure extends to all types of gas turbine engines and to all types of applications, including but not limited to, three spool turbofan configurations as well as land based gas turbine engines that do not necessarily incorporate a fan section.

The example gas turbine engine 10 of FIG. 1 generally includes at least a low speed spool 22 and a high speed spool 24 mounted for rotation about an engine centerline axis 12 relative to an engine static structure 27 via several bearing systems 29. The low speed spool 22 generally includes an inner shaft 31 that interconnects a fan 33, a low pressure compressor 17, and a low pressure turbine 21. The inner shaft 31 can connect to the fan 33 through a geared architecture 35 to drive the fan 33 at a lower speed than the low speed spool 22. Although the geared architecture 35 is schematically depicted between the fan 33 and the low pressure compressor 17, it should be understood that the geared architecture 35 could be disposed at other locations of the gas turbine engine 10. The high speed spool 24 includes an outer shaft 37 that interconnects a high pressure compressor 19 and a high pressure turbine 23.

A combustor 15 is arranged between the high pressure compressor 19 and the high pressure turbine 23. The inner shaft 31 and the outer shaft 37 are concentric and rotate about the engine centerline axis 12. A core airflow is compressed by the low pressure compressor 17 and the high pressure compressor 19, is mixed with fuel and burned within the combustor 15, and is then expanded over the high pressure turbine 23 and the low pressure turbine 21. The turbines 21, 23 rotationally drive the low speed spool 22 and the high speed spool 24 in response to the expansion.

The compressor section 16 and the turbine section 20 can each include alternating rows of rotor assemblies 39 and vane assemblies 41. The rotor assemblies 39 carry a plurality of rotating blades, while each vane assembly 41 includes a plurality of vanes. The blades of the rotor assemblies 39 create or extract energy (in the form of pressure) from core airflow that is communicated through the gas turbine engine 10. The vanes of the vane assemblies 41 direct airflow to the blades of the rotor assemblies 39 to either add or extract energy.

Various components of the gas turbine engine 10, including airfoils such as the blades and vanes of the compressor section 16 and the turbine section 20, are subjected to repetitive thermal cycling under widely ranging temperatures and pressures. The hardware of the turbine section 20 is subjected to particularly extreme operating conditions. Therefore, some components may require internal cooling circuits for cooling the parts during engine operation. Example cooling circuits for cooling components are discussed below.

Figure 2:
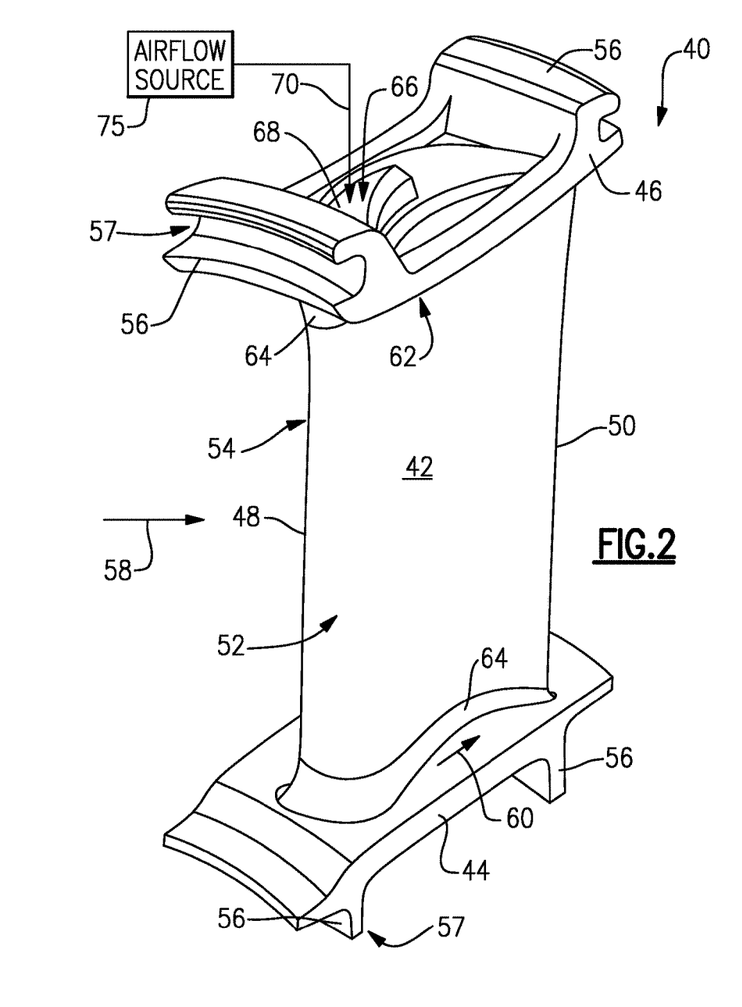
FIG. 2 illustrates an airfoil of a gas turbine engine.

FIG. 2 illustrates an airfoil 40 that can be incorporated into a gas turbine engine, such as the gas turbine engine 10 of FIG. 1. In this example, the airfoil 40 is a vane of a vane assembly 41 of either the turbine section 20 or the compressor section 16. However, the teachings of this disclosure are not limited to vane airfoils and could extend to other airfoils including blades and also non-airfoil hardware of the gas turbine engine. This disclosure also could extend to airfoils of a middle turbine frame of the gas turbine engine 10.

The airfoil 40 includes an airfoil body 42 that extends between an inner platform 44 (on an inner diameter side) and an outer platform 46 (on an outer diameter side). The airfoil 40 also includes a leading edge 48, a trailing edge 50, a pressure side 52 and a suction side 54. The airfoil body 42 extends in chord between the leading edge 48 and the trailing edge 50.

Both the inner platform 44 and the outer platform 46 include leading and trailing edge rails 56 having one or more engagement features 57 for mounting the airfoil 40 to the gas turbine engine 10, such as to an engine casing. Other engagement feature configurations are contemplated as within the scope of this disclosure, including but not limited to, hooks, rails, bolts, rivets and tabs that can be incorporated into the airfoil 40 to retain the airfoil 40 to the gas turbine engine 10.

A gas path 58 is communicated axially downstream through the gas turbine engine 10 in a direction that extends from the leading edge 48 toward the trailing edge 50 of the airfoil body 42. The gas path 58 (for the communication of core airflow along a core flow path) extends between an inner gas path 60 associated with the inner platform 44 and an outer gas path 62 associated with the outer platform 46 of the airfoil 40. The inner platform 44 and the outer platform 46 are connected to the inner and outer gas paths 60, 62 via fillets 64.

The airfoil body 42 includes an internal core 66 having an inlet 68 that receives a cooling airflow 70 from an airflow source 75 that is external to the airfoil 40. In this embodiment, the inlet 68 of the internal core 66 is positioned at the outer platform 46 of the airfoil 40, although the inlet 68 could also be positioned at the inner platform 44. The cooling airflow 70 is a lower temperature than the airflow of the gas path 58 that is communicated across the airfoil body 42. In one example, the cooling airflow 70 is a bleed airflow that can be sourced from the compressor section 16 or any other portion of the gas turbine engine 10 that is upstream from the airfoil 40. The cooling airflow 70 is circulated through a cooling circuit 72 (See FIGS. 3-5) of the airfoil 40 to transfer thermal energy from the airfoil 40 to the cooling airflow 70.

Figure 6:
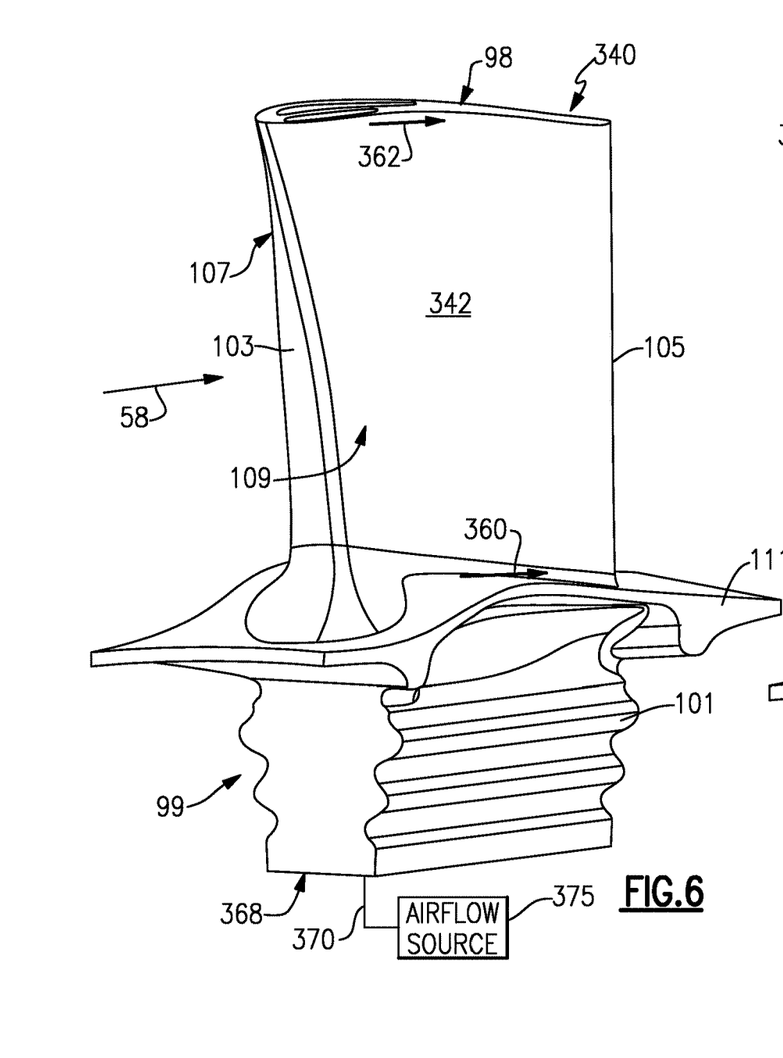
FIG. 6 illustrates another airfoil of a gas turbine engine.
Figure 7:
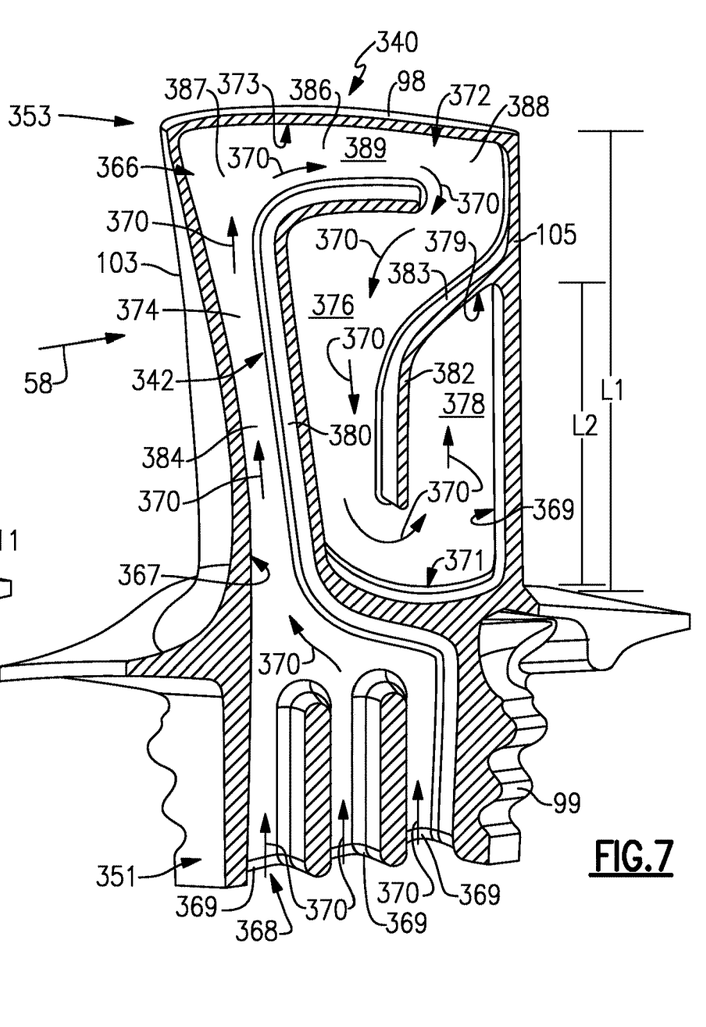
FIG. 7 illustrates a cooling circuit that can be incorporated into the airfoil of FIG. 6.

A cooling circuit such as disclosed herein can be disposed in any component that requires cooling, including but not limited to those components that are exposed to the gas path 58 of the gas turbine engine 10. In the illustrated embodiments and for the purpose of providing detailed examples, the cooling circuits of this disclosure are disposed within a portion of an airfoil, such as a stator vane (FIGS. 2-5) or a rotor blade (FIGS. 6-7). It should be understood, however, that the cooling circuits are not limited to these applications and can be utilized within other areas of the gas turbine engine that are exposed to relatively extreme environments.

Figure 3:
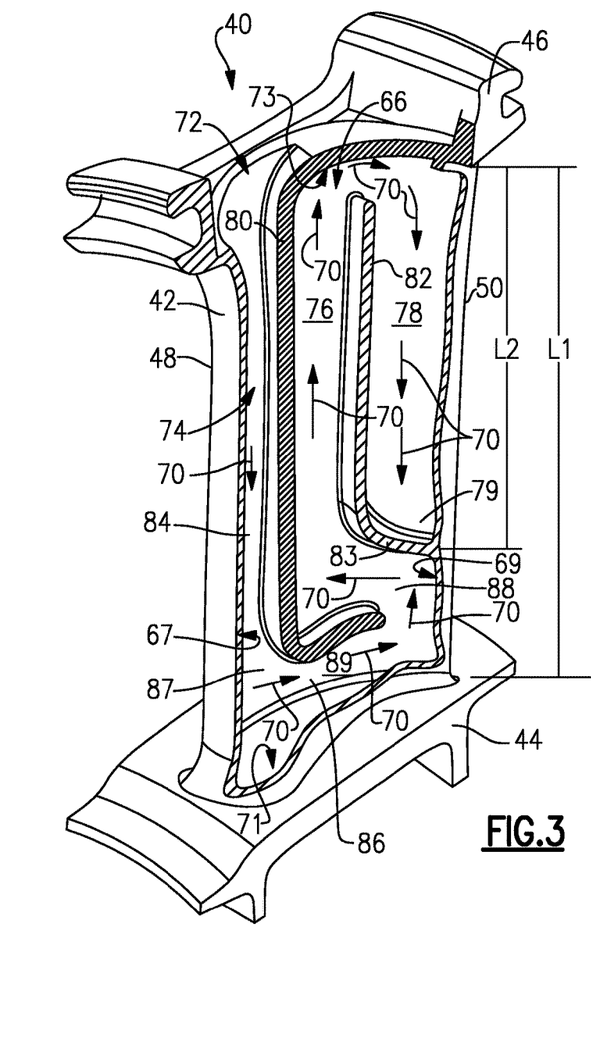
FIG. 3 illustrates a cooling circuit that can be incorporated into the airfoil of FIG. 2.

FIG. 3 illustrates an example cooling circuit 72 of an airfoil 40. The cooling circuit 72 is defined inside of the airfoil body 42. In this example, the cooling circuit 72 establishes a multi-pass cooling passage within the internal core 66 of the airfoil body 42. Although a three-pass cooling circuit is depicted by FIG. 3, it should be understood that the cooling circuit 72 could include any number of passes. For example, a two-pass or four-pass cooling passage could be incorporated into the airfoil 40.

The example cooling circuit 72 includes a first cavity 74 (i.e., a leading edge cavity), a second cavity 76 (i.e., an intermediate cavity), and a third cavity 78 (i.e., a trailing edge cavity). The cavities 74, 76, 78 direct the cooling airflow 70 through the cooling circuit 72 to cool any high temperature areas of the airfoil body 42. The first cavity 74 is in fluid communication with the second cavity 76, and the second cavity 76 is in fluid communication with the third cavity 78. Accordingly, the cooling airflow 70 received within the cooling circuit 72 can be circulated through the first cavity 74, then through the second cavity 76, and then through the third cavity 78 to cool the airfoil 40.

A first rib 80 separates the first cavity 74 from the second cavity 76, and a second rib 82 divides the second cavity 76 from the third cavity 78. In this example, the first rib 80 and the second rib 82 are generally L shaped. The first and second ribs 80, 82 extend generally parallel to a longitudinal axis of the airfoil 40. In this example, the first rib 80 extends across a greater radial depth than the second rib 82 (i.e., the first rib 80 is longer than the second rib 82).

The internal core 66 of the airfoil 40 establishes a leading edge inner wall 67, a trailing edge inner wall 69, an inner platform inner wall 71 and an outer platform inner wall 73. The cooling circuit 72 extends axially between the leading edge inner wall 67 and the trailing edge inner wall 69 and radially between the inner platform inner wall 71 and the outer platform inner wall 73.

The first cavity 74 of the cooling circuit 72 includes a first portion 84 and a second portion 86 that is transverse relative to the first portion 84. In one example, the second portion 86 is generally perpendicular relative to the first portion 84 and establishes a turn 87 at the inner platform inner wall 71. The first portion 84 extends in span between the inner platform inner wall 71 and the outer platform inner wall 73 of the airfoil body 42. The second portion 86 extends in chord between the leading edge 48 and the trailing edge 50 of the airfoil body 42. In one example, the second portion 86 extends across an entire space 89 between the leading edge inner wall 67 and the trailing edge inner wall 69. In other words, the first cavity 74 can extend across the entire radial length and axial width of the internal core 66. The second portion 86 can include a U-shape curved portion 88 (i.e., an oxbow shaped portion) that transitions the first cavity 74 into the second cavity 76.

The cooling airflow 70 can be communicated between the outer platform 46 and the inner platform 44 within the first portion 84 of the first cavity 74, and then from the leading edge 48 to the trailing edge 50 of the airfoil body 42 within the second portion 86 of the first cavity 74 before being communicated into the second cavity 76 of the cooling circuit 72. After the cooling airflow 70 is circulated back toward the outer platform inner wall 73, the cooling airflow 70 can be circulated into the third cavity 78. It should be understood that an opposite configuration is also contemplated in which the cooling airflow 70 is communicated from the trailing edge 50 toward the leading edge 48, or from the inner platform 44 toward the outer platform 46, or both.

Once in the third cavity 78, the cooling airflow 70 is communicated radially across a length L2 that is only a portion of a length L1 of the trailing edge 50 of the airfoil body 42 and can be communicated to the gas path 58. In one example, the length L2 is 75% of the length of L1. In another example, the length L2 is between 50% and 85% of the length L1. The actual length L2 of the third cavity 78 can vary depending on the size and shape of the airfoil body 42.

The third cavity 78 includes a close-ended portion 79 that is established by an L-shaped portion 83 of the second rib 82. In other words, the third cavity 78 does not extend all the way to the inner platform 44 of the airfoil 40. The cooling circuit 72 communicates the cooling airflow 70 through the airfoil body 42 without the need to extract the cooling airflow 70 from the lower portion of the airfoil body 42 after it is circulated through the third cavity 78.

The gas path 58 defines a temperature profile that may be peeked near the outer gas path 62 of the airfoil 40. In other words, during engine operation, the airfoil 40 is hottest near the outer gas path 62 and coolest near the inner gas path 60 (or vice versa). The cooling circuit 172 described above is designed to address the cooling requirements necessitated by such temperature profiled while avoiding dead spots (i.e., areas within the internal core 66 where the cooling airflow 70 does not actively move) without wasting cooling airflow 70.

Figure 4:
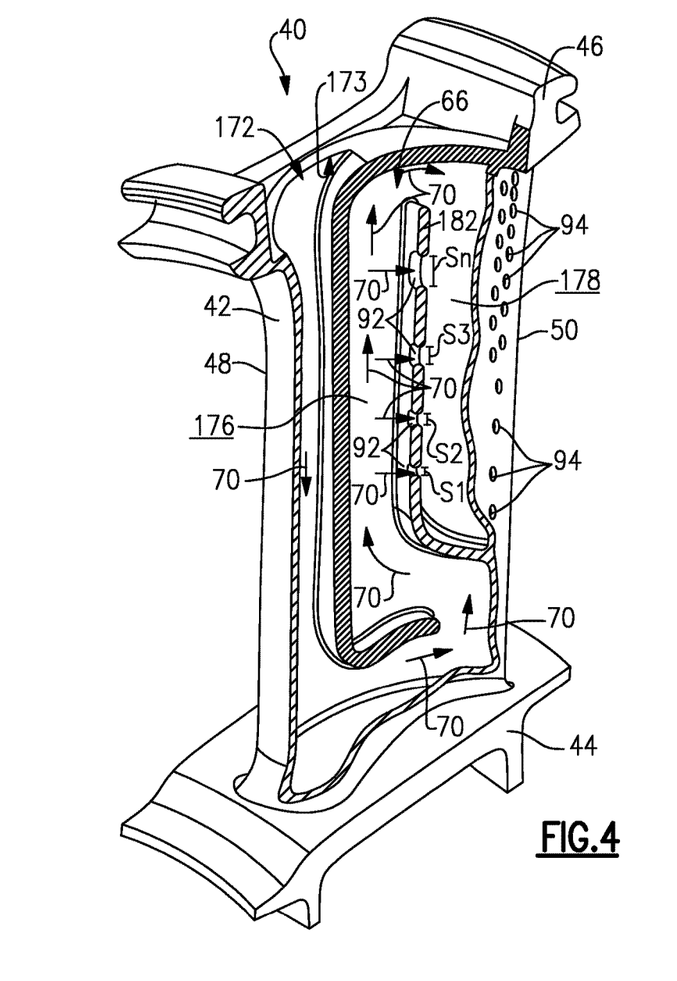
FIG. 4 illustrates another cooling circuit of an airfoil.

FIG. 4 illustrates another example cooling circuit 172 of the airfoil 40. The cooling circuit 172 is substantially similar to the cooling circuit 72 of FIG. 3 except that the cooling circuit 172 includes additional features that can be incorporated into the internal core 66 of the airfoil 40. For example, a rib 182 of the second cooling circuit 172 that is adjacent to the trailing edge 50 includes a plurality of openings 92 that extend through the rib 182 between a second cavity 176 and a third cavity 178. The openings 92 can include increasing sizes S1 to Sn in a direction that extends from the inner diameter of the airfoil 40 toward the outer diameter of the airfoil 40. The actual number, size, geometry, and overall configuration of the openings 92 can vary and is not intended to limit this disclosure.

The openings 92 allow the cooling airflow 70 to be communicated from the second cavity 176 into the third cavity 178 prior to circulating the cooling airflow 70 through an entire length of the second cavity 176 (i.e. all the way to the outer platform inner wall 73 of this example). The cooling circuit 172 can also include a second plurality of openings 94 through which the cooling airflow 70 can escape the third cavity 178. In this example, the openings 94 are positioned near the trailing edge 50 of the airfoil 40. The openings 94 can be drilled into the airfoil body 42 or can be formed in another know manner. The trailing edge 50 can include an increasing number of openings 94 toward the outer platform 46 of the airfoil 40.

Figure 5:
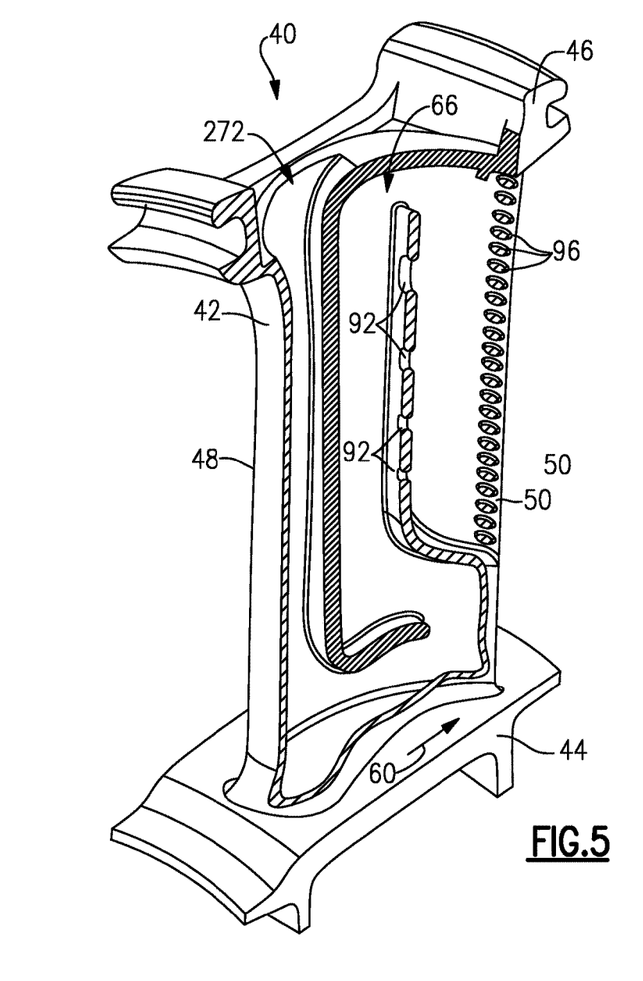
FIG. 5 illustrates yet another cooling circuit of an airfoil.

FIG. 5 illustrates yet another cooling circuit 272 of the airfoil 40. The cooling circuit 272 is substantially similar to the cooling circuits 72, 172 expect that the cooling circuit 272 includes a plurality of teardrop shaped holes 96 in addition to or in place of the second plurality of openings 94. The teardrop shaped holes 96 can provide additional cooling capacity for the cooling circuit 272. The teardrop shaped holes 96 are positioned radially outboard of the inner gas path 60. The teardrop shaped holes 96 can be formed using a ceramic core or a refractory metal core or in other known manners.

FIG. 6 illustrates another airfoil 340 that can be incorporated into the gas turbine engine 10. In this example, the airfoil 340 is a blade, such as a blade of a rotor assembly. The airfoil 340 can be incorporated into either the compressor section 16 or the turbine section 20 of the gas turbine engine 10.

The airfoil 340 includes an airfoil body 342 that extends between a tip portion 98 and a root portion 99. The root portion 99 can include a fir-tree configuration 101 for attachment to a rotor assembly (not shown) for circumferential rotation about the engine centerline axis 12. Of course, other attachment configurations are also contemplated.

The airfoil body 342 extends between a leading edge 103 and a trailing edge 105 and includes a suction side 107 and a pressure side 109. The root portion 99 can also include a platform 111. A gas path 58 is communicated axially downstream through the gas turbine engine 10 in a direction that extends from the leading edge 103 toward the trailing edge 105 of the airfoil body 342. The gas path 58 (for the communication of core airflow along a core flow path) extends between an inner gas path 360 associated with the platform 111 and an outer gas path 362 associated with the tip portion 98 of the airfoil 340.

The airfoil body 342 includes an internal core 366 (See FIG. 7) having an inlet 368 that receives a cooling airflow 370 from an airflow source 375 that is external to the airfoil 340. In this embodiment, the inlet 368 of the internal core 366 is positioned on the radially inward side of the airfoil 340 (i.e., adjacent to the root portion 99). The cooling airflow 370 is a lower temperature than the airflow of the gas path 58 that is communicated across the airfoil body 342. The cooling airflow 370 can be sourced from the compressor section 16 or any other portion of the gas turbine engine 10 that is upstream from the airfoil 340. The cooling airflow 370 is circulated through a cooling circuit 372 (See FIG. 7) of the airfoil 340 to transfer thermal energy from the airfoil 340 to the cooling airflow 370.

FIG. 7 illustrates an example cooling circuit 372 of the airfoil 340. The cooling circuit 372 is defined inside of the airfoil body 342. The cooling circuit 372 establishes a multi-pass cooling passage within the internal core 366 of the airfoil body 342. The inlet 368 of the cooling circuit 372 is partitioned to include a multitude of openings 369 that receive the cooling airflow 370 from the airflow source 375.

The cooling circuit 372 includes a first cavity 374 (i.e., a leading edge cavity), a second cavity 376 (i.e., an intermediate cavity), and a third cavity 378 (i.e., a trailing edge cavity). The cavities 374, 376, 378 direct the cooling airflow 370 through the cooling circuit 372 to cool any high temperature areas of the airfoil 340. The first cavity 374 is in fluid communication with the second cavity 376, and the second cavity 376 is in fluid communication with the third cavity 378. Accordingly, the cooling airflow 370 received within the cooling circuit 372 can be circulated through the first cavity 374, then through the second cavity 376, and then through the third cavity 378 to cool the airfoil 340.

A first rib 380 separates the first cavity 374 from the second cavity 376, and a second rib 382 divides the second cavity 376 from the third cavity 378. In this example, the first rib 380 and the second rib 382 are generally L shaped. The first and second ribs 380, 382 extend generally parallel to a longitudinal axis of the airfoil 340. The first rib 380 can extend across a greater radial depth than the second rib 382 (i.e., the first rib 380 is longer than the second rib 382).

The internal core 366 of the airfoil 340 establishes a leading edge inner wall 367, a trailing edge inner wall 369, a radially inner wall 371 and a radially outer wall 373. The cooling circuit 372 extends axially between the leading edge inner wall 367 and the trailing edge inner wall 369 and radially between the radially inner wall 371 and the radially outer wall 373.

The first cavity 374 of the cooling circuit 372 includes a first portion 384 and a second portion 386 that is transverse to the first portion 384. In one example, the second portion 386 is generally perpendicular relative to the first portion 384 and establishes a turn 387 at the radially outer wall 373. The first portion 384 extends in span between an inner diameter 351 and an outer diameter 353 of the airfoil 340. The second portion 386 extends in chord between the leading edge 103 and the trailing edge 105 of the airfoil body 342. The second portion 386 can extend across an entire space 389 between the leading edge inner wall 367 and the trailing edge inner wall 369. In other words, the first cavity 374 can extend across the entire radial length and axial width of the internal core 366. The second portion 386 can include a U-shape curved portion 388 that transitions the first cavity 374 into the second cavity 376.

The cooling airflow 370 can be communicated between the root portion 99 and the tip portion 98 within the first portion 384 of the first cavity 374, and then from the leading edge 103 to the trailing edge 105 of the airfoil body 342 within the second portion 386 of the first cavity 374 before being communicated into the second cavity 376 of the cooling circuit 372. After the cooling airflow 370 is circulated back toward the radially inner wall 373, the cooling airflow 370 can be circulated into the third cavity 378. It should be understood that an opposite configuration is also contemplated in which the cooling airflow 370 is communicated from the trailing edge 105 toward the leading edge 103, or from the tip portion 98 toward the root portion 99, or both.

Once in the third cavity 378, the cooling airflow 370 is communicated radially across a length L2 that is only a portion of a length L1 of the trailing edge 105 of the airfoil body 342. In one example, the length L2 is 75% of the length of L1. In another example, the length L2 is between 50% and 85% of the length L1. The actual length L2 of the third cavity 378 can vary depending on the size and shape of the airfoil body 342.

The third cavity 378 includes a close-ended portion 379 that is established by an L-shaped portion 383 of the second rib 382. In other words, the third cavity 378 does not extend across the entire length L1 of the trailing edge 105. The cooling circuit 372 communicates the cooling airflow 370 through the airfoil body 342 without the need to extract the cooling airflow 370 from the tip portion 98 of the airfoil body 342 after it is circulated through the third cavity 378.

The gas path 58 may define a temperature profile that is peeked near the inner gas path 360 of the airfoil 340. In other words, during engine operation, the airfoil 340 is hottest near the inner gas path 360 and coolest near the outer gas path 362 (or vice versa). The cooling circuit 372 described above is designed to address the cooling requirements necessitated by such a temperature profile while avoiding dead spots (i.e., areas within the internal core 366 where the cooling airflow 370 does not actively move) without wasting cooling airflow 370.

The cooling circuit 372 can also incorporate additional features including those features shown in FIGS. 5-6 related to the cooling circuits 172, 272. For example, the openings 92, 94, and 96 can be incorporated into the cooling circuit 372.

Although the different examples have the specific components shown in the illustrations, embodiments of this disclosure are not limited to those particular combinations. It is possible to use some of the components or features from one of the examples in combination with features or components from another one of the examples.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An airfoil for a gas turbine engine, comprising:
an airfoil body;
a cooling circuit disposed inside said airfoil body and including a leading edge cavity with a first portion extending directly from a radially inner wall to a radially outer wall of said airfoil body and a second portion that extends chordwise along said radially inner wall and from a leading edge inner wall to a trailing edge inner wall of said airfoil body, wherein said second portion is perpendicular relative to said first portion and establishes a turn at one of said radially inner wall and said radially outer wall, and said cooling circuit is configured to communicate cooling airflow through said first portion and said second portion prior to exiting said leading edge cavity into a third portion of a second cavity of said cooling circuit; and
an L-shaped rib that separates said leading edge cavity from said second cavity, wherein a radially extending portion of said rib provides a surface of each of said first portion and said second cavity, and said third portion extends from said trailing edge inner wall and along a chordwise extending portion of said L-shaped rib and a fourth portion extending directly from said third portion to the other of said radially inner wall and said radially outer wall.

2. The airfoil as recited in claim 1, wherein said second portion and said third portion form an oxbow shaped portion defined by said chordwise extending portion of said L-shaped rib and said trailing edge inner wall, wherein said oxbow shaped portion transitions said leading edge cavity into said second cavity.

3. The airfoil as recited in claim 1, wherein said airfoil is a vane.

4. The airfoil as recited in claim 1, comprising a third cavity in fluid communication with said second cavity and separated from said second cavity by a second rib, wherein said second rib includes a plurality of openings that extend through said second rib between said second cavity and said third cavity.

5. The airfoil as recited in claim 1, comprising a third cavity in fluid communication with said second cavity, wherein said third cavity includes a close-ended portion, wherein said third cavity extends across a length that is smaller than a length of a trailing edge of said airfoil body.

6. The airfoil as recited in claim 1, wherein said L-shaped rib separates said second portion of said leading edge cavity from said second cavity.

7. An airfoil for a gas turbine engine, comprising:
an airfoil body having a leading edge and a trailing edge;
a cooling circuit disposed inside said airfoil body and including
a leading edge cavity including a first portion extending directly from a radially inner wall to a radially outer wall of said airfoil body and a second portion perpendicular to said first portion and extending from the first portion to a trailing edge inner wall of said airfoil body, such that said first portion and said second portion establish a turn at said radially inner wall,
a second cavity,
an L-shaped rib separating said leading edge cavity from said second cavity, wherein a radially extending portion of said rib provides a surface of each of said first portion and said second cavity,
wherein said second portion includes an oxbow shaped portion defined by a chordwise extending portion of said L-shaped rib and said trailing edge inner wall, said oxbow shaped portion transitions said leading edge cavity into said second cavity, and said second portion includes a chordwise portion that extends directly chordwise from said first portion to said oxbow portion between said chordwise extending portion of said L-shaped rib and said radially inner wall.

8. The airfoil as recited in claim 7, wherein said cooling circuit includes
a trailing edge cavity,
a second rib dividing said second cavity and said trailing edge cavity, wherein said L-shaped rib extends a greater radial depth than said second rib.

9. The airfoil as recited in claim 8, wherein said second rib is L-shaped.

10. The airfoil as recited in claim 3, comprising a third cavity in fluid communication with said second cavity, wherein said third cavity includes a close-ended portion, wherein said third cavity extends across a length that is smaller than a length of a trailing edge of said airfoil body.

11. A vane for a gas turbine engine, comprising:
an airfoil body;
a cooling circuit disposed inside said airfoil body and including a leading edge cavity with a first portion extending directly from a radially inner wall to a radially outer wall of said airfoil body and a second portion that extends from a leading edge inner wall to a trailing edge inner wall of said airfoil body, wherein said second portion establishes a turn at said radially inner wall, said cooling circuit is configured to communicate cooling airflow through said first portion and said second portion prior to exiting said leading edge cavity at said turn and into a third portion of a second cavity of said cooling circuit;
an L-shaped rib that separates said leading edge cavity from said second cavity, wherein said third portion extends from said trailing edge inner wall and along a chordwise extending portion of said L-shaped rib and a fourth portion extending directly from said third portion to the other of said radially inner wall and said radially outer wall; and
a third cavity in fluid communication with said second cavity, wherein said third cavity includes a close-ended portion, wherein said third cavity extends across a length that is smaller than a length of a trailing edge of said airfoil body.

12. The vane as recited in claim 11, wherein said second portion and said third portion form an oxbow shaped portion defined by said chordwise extending portion of said L-shaped rib and said trailing edge inner wall, wherein said oxbow shaped portion transitions said leading edge cavity into said second cavity.

13. The vane as recited in claim 11, wherein a second rib separates said second cavity from said third cavity.

14. The vane as recited in claim 13, wherein said second rib includes a plurality of openings that extend through said second rib between said third cavity and said second cavity.

15. The vane as recited in claim 14, wherein said second portion and said third portion form an oxbow shaped portion defined by said chordwise extending portion of said L-shaped rib and said trailing edge inner wall, wherein said oxbow shaped portion transitions said leading edge cavity into said second cavity.

* * * * *